(12) United States Patent
Ishimoto et al.

(10) Patent No.: US 8,367,145 B2
(45) Date of Patent: Feb. 5, 2013

(54) ACIDIC PROTEIN FOOD OR DRINK AND MATERIAL THEREOF

(75) Inventors: Kyoko Ishimoto, Izumisano (JP); Tsutomu Saito, Izumisano (JP); Toshio Kiriyama, Izumisano (JP); Eiji Iwaoka, Tsukuba-gun (JP)

(73) Assignee: Fuji Oil Company, Limited, Osaka (JP)

( * ) Notice: Subject to any disclaimer, the term of this patent is extended or adjusted under 35 U.S.C. 154(b) by 0 days.

(21) Appl. No.: 12/965,039

(22) Filed: Dec. 10, 2010

(65) Prior Publication Data

US 2011/0076369 A1    Mar. 31, 2011

Related U.S. Application Data

(62) Division of application No. 10/579,972, filed as application No. PCT/JP2004/019045 on Dec. 20, 2004.

(30) Foreign Application Priority Data

Dec. 19, 2003 (JP) .................................. 2003-422881
Jul. 2, 2004 (JP) .................................. 2004-196919

(51) Int. Cl.
*A23J 1/00* (2006.01)
(52) U.S. Cl. ......... 426/656; 426/622; 426/615; 426/569
(58) Field of Classification Search .................... 426/656
See application file for complete search history.

(56) References Cited

U.S. PATENT DOCUMENTS

| 6,287,623 | B1 | 9/2001 | Nakayama et al. |
| 7,229,659 | B2 * | 6/2007 | Shen ............................. 426/598 |
| 2002/0142071 | A1 | 10/2002 | Tsukuda et al. |
| 2004/0086624 | A1 | 5/2004 | Saito et al. |

FOREIGN PATENT DOCUMENTS

| EP | 0 666 034 | 8/1995 |
| EP | 1 364 585 | 11/2003 |
| EP | 1 537 787 | 6/2005 |
| JP | 53-104764 | 9/1978 |
| JP | 54-84068 | 7/1979 |
| JP | 62-111632 | 5/1987 |
| JP | 7-99947 | 4/1995 |
| JP | 10-295270 | 11/1998 |
| JP | 2002-125587 | 5/2002 |
| WO | 98/42214 | 10/1998 |
| WO | 02/067690 | 9/2002 |
| WO | 02/071872 | 9/2002 |

OTHER PUBLICATIONS

JP 4-5007458A : Masutake et al. (1993), Derwent Abstract only.*
Chinese Office Action (including its English translation) issued Jan. 29, 2010 in corresponding Chinese Patent Application No. 200480037983.0.
Saito et al. WO 02/067690, Machine Translation completed Feb. 12, 2010.

* cited by examiner

*Primary Examiner* — Elizabeth Gwartney
(74) *Attorney, Agent, or Firm* — Wenderoth, Lind & Ponack, L.L.P.

(57) ABSTRACT

The problem to be solved by the invention is to provide a food or a drink containing an acidic protein which has a favorable flavor with relieved astringency characteristic to a protein dissolved under acidic conditions to thereby broaden the flavor variety of protein-containing foods or drinks. The above problem can be solved by adding a water soluble polysaccharide, a water soluble basic salt, an alkali metal salt of an organic acid, a basic monosaccharide, a basic oligosaccharide or the like to a food or a drink containing a protein dissolved under acidic conditions to thereby relieve the astringency originating in the protein dissolved under acidic conditions.

1 Claim, No Drawings

ACIDIC PROTEIN FOOD OR DRINK AND MATERIAL THEREOF

This application is a Divisional of U.S. application Ser. No. 10/579,972, filed May 23, 2006, which is the National Stage of International Application No. PCT/JP2004/019045, filed Dec. 20, 2004.

TECHNICAL FIELD

The present invention relates to an acidic food or drink containing protein in a dissolved state, and materials thereof.

BACKGROUND ART

Protein-rich foods or drinks, which have been taken by athletes for protein supplementation, are increasingly demanded in recent years because now they are also often taken by elderly people for nutritional supplement and by ordinary consumers as a substitute for a diet. Most of these protein foods or drinks are concentrated in a neutral pH range, thus the flavor thereof tends to be monotonous. Those having an acidic flavor can broaden the taste variety, but there are not so many of them because many of protein are slightly soluble under acidic conditions.

Examples of known protein-containing acidic foods or drinks include fermented milk beverages and other sour milk beverages. However, these protein-containing acidic foods or drinks have "astringency" that is a peculiar smell or an unpleasant taste, thereby giving an unpleasant feeling that is often expressed by such terms as an astringent taste, a filmy mouthfeel and graininess. In these protein-containing acidic foods or drinks, protein that has been insolubilized and flocculated (or aggregated) by an acid, heating, fermentation or the like is in a dispersed state, and the flocculate (or aggregate, hereinafter simply referred to as flocculate) is recognized as a cause of astringency. Therefore, it has been attempted to relieve the astringency by reducing the particle size of the flocculate (Patent Document 1), or by removing the flocculate (Patent Document 2). Further, Patent Document 3 discloses a process for preparing a beverage with relieved astringency, said beverage comprising fermented whey, soybean milk, and pectin or xanthan gum as a stabilizer, and Patent Document 4 discloses a method, wherein propylene glycol alginate and a metallic salt is added as modifiers having an astringency relieving effect after homogenizing fermented soybean milk. However, either of these methods is not directed to the reduction of astringency developed during eating or drinking dissolved protein.

There are acidic foods or drinks containing dissolved protein at a high concentration, while their numbers are very limited. They are beverages and jelly beverages containing a whey protein isolate (WPI) in an amount of 3 to 9%, and are characterized by their transparency. The present inventors have previously found a process for producing a soybean protein that shows excellent solubility under acidic conditions (Patent Document 5), and have succeeded in preparing protein-rich acidic foods or drinks using the protein. However these acidic protein foods or drinks were unexpectedly more astringent rather than aforementioned acid milk beverages. This phenomenon contradicts the conventional recognition that astringency is derived from the flocculate of protein. Although such astringency of acidic foods or drinks containing dissolved protein can be relieved depending upon a protein concentration or a processing method, no decisive improvement measure has yet found.

Patent Document 1: JP 53-104764 A
Patent Document 2: JP 10-295270 A
Patent Document 3: JP 62-111632 A
Patent Document 4: JP 54-84068 A
Patent Document 5: WO 02/067690 A1

DISCLOSURE OF THE INVENTION

Problem to be Solved by the Invention

The present invention intends to provide a protein-containing acidic food or drink having a favorable flavor and relieved astringency that is characteristic to a dissolved protein, and to provide materials thereof. In case that the acidic food or drink is a cloudy-type fruit juice beverage, the present invention also intends to prevent formation of dregs.

Means for Solving the Problem

The present inventors have found that protein-containing acidic foods or drinks have characteristic astringency, and that the astringency is more strongly felt when protein is dissolved than when a major part of the protein has been flocculated like in a sour milk beverage, and this is significantly perceived when a beverage is drank or a frozen dessert is melted in the mouth.

More specifically, the present inventors have presumed that there is astringency derived from protein dissolved under acidic conditions, and that this astringency is an unpleasant feeling when the protein is mixed with saliva to cause flocculation in the mouth. Then, the present inventors have intensively studied to improve this astringency. As a result, they have found that the astringency of the beverage is remarkably relieved by addition of a water-soluble polysaccharide, a calcium salt or a basic saccharide, and thus have completed the present invention. They have also found that the advantageous effect of the present invention is not limited to beverages, but extends to semi-solid foods such as gel or paste ones and emulsions such as ice cream, soft cream and whipped cream containing dissolved protein. That is, the present invention is:

(1) An acidic protein food or drink comprising one or more of salts or saccharides selected from the group consisting of water-soluble polysaccharides, water-soluble basic salts, alkali metal salts of organic acids, basic monosaccharides and basic oligosaccharides, and acidic-soluble protein;

(2) The acidic protein food or drink according to the above (1), wherein the acidic-soluble protein is that of soybean origin;

(3) The acidic protein food or drink according to the above (1), wherein the acidity is in the range of pH 2.0-4.5;

(4) The acidic protein food or drink according to the above (1), wherein the food or drink is a beverage, an aqueous phase-containing emulsion or a frozen dessert;

(5) A powder material comprising one or more of salts or saccharides selected from the group consisting of water-soluble polysaccharides, water-soluble basic salts, alkali metal salts of organic acids, basic monosaccharides and basic oligosaccharides, and acidic-soluble protein;

(6) An acidic-soluble protein material with relieved astringency comprising one or more of added salts or saccharides selected from the group consisting of water-soluble polysaccharides, water-soluble basic salts, alkali metal salts of organic acids, basic monosaccharides and basic oligosaccharides which are added thereto;

(7) The material according to the above (5) or (6), which is an agent for preventing formation of dregs of cloudy-type fruit juice.

Effect of the Invention

The present invention provides a protein-containing food or drink containing protein dissolved under acidic conditions and having a favorable flavor and relieved astringency. Further, in case that the acidic food or drink is a cloudy-type fruit juice beverage, the present invention has such a secondary effect for preventing formation of dregs.

BEST MODE FOR CARRYING OUT THE INVENTION

In the present invention, astringency or an astringent taste is an unpleasant feeling caused by protein dissolved under acidic conditions, and usually includes "astringency", "such feeling as if a film is formed in the mouth (filmy mouthfeel)", "irritation" and the like.

The acidic food or drink in the present invention may be pH 2 or higher to below pH 7, but astringency tends to occur at pH 4.5 or lower. In case of prevention of formation of dregs of a cloudy-type fruit juice beverage, dregs are formed not only at pH 4.5 or lower but also at an acidic range of higher than pH 4.5. The acidic-soluble protein to be used has solubility (described hereinafter) of preferably 55% or higher, more preferably 60% or higher, and further more preferably 65% or higher at the pH of the acidic food or drink.

The acidic-soluble protein may be either of vegetable protein or animal protein, and a hydrolysate thereof may also be used. In particular, whey protein concentrate (WPC) and whey protein isolate (WPI) of milk origin are easily available, and in recent years, acidic-soluble soybean protein is also available. Although the acidic-soluble protein of soybean origin as a material has stronger astringency than whey protein such as WPC and WPI, the improving effect obtained by addition of saccharides or salts according to the present invention can be realized more significantly in case of acidic-soluble soybean protein.

While the production process of acidic-soluble soybean protein is not specifically limited, for example, acidic-soluble soybean protein having solubility of 60% or higher at pH 4.0 or lower can be prepared by heating a solution containing constituent soybean protein at a temperature exceeding 100° C. in an acidic pH range lower than the isoelectric point of the constituent protein. Further, the production process disclosed in WO2002/67690 can also be used. That is, the production process of WO2002/67690 is characterized in that a treatment is carried out in a solution containing constituent soybean protein to increase the positive surface charge of constituent soybean protein particles in an acidic range. More specifically, for example, there is a treatment (A) for removal or inactivation of polyanion substances such as phytic acid derived from constituent protein used as the raw material in the solution, for example, decomposition or removal of phytic acid contained in soybeans by phytase or the like, a treatment (B) for addition of a polycation substance such as chitosan to the solution, or a combination of both treatments (A) and (B) in an acidic range. These treatments can increase solubility of constituent soybean protein under acidic conditions, thereby preventing flocculation under acidic conditions, and inhibiting precipitation during storage. In this case, in particular, the solution of the constituent protein is preferably heated at a temperature exceeding 100° C. in an acidic pH range lower than the isoelectric point of the constituent protein after the above treatments, thereby being able to obtain the acidic-soluble soybean protein having higher solubility and transparency under acidic conditions and less precipitation during storage.

Soybean protein used herein as a raw material of the acidic-soluble soybean protein is not specifically limited as long as it contains constituent soybean protein, and is appropriately selected from soybean milk (regardless of whole or defatted soybean milk; the same hereinafter), acid precipitation curd of soybean milk, soybean protein isolate, soybean powder, ground soybeans, etc., and, where necessary, water is added thereto.

The amount of the acidic-soluble soybean protein in the food or drink of the present invention is not specifically limited, and the optimal amount varies according to particular form, processing method, composition and purposes of the food or drink, and can be appropriately selected by those skilled in the art. For example, the content in the beverage is 0.1 to 20% by weight, preferably 0.5 to 10% by weight, and more preferably 1 to 5% by weight based on the total weight of solids in view of a favorable flavor and smooth swallowing. The content in gel foods such as jelly is 1 to 25% by weight, and preferably from 3 to 12% by weight. If the content is too low, the significance of protein intake is lost.

In the present invention, the salts or saccharides to be used in combination with the acidic-soluble protein are selected from water-soluble polysaccharides, basic salts, alkali metal salts of organic acids, basic monosaccharides and basic oligosaccharides.

Examples of the water-soluble polysaccharides include water-soluble soybean polysaccharides, gum arabic, gum tragacanth, locust bean gum, guar gum, glucomannan, psyllium seed gum, tamarind seed gum, tara gum, alginic acid, carrageenan, agar, fucellaran, pectin, curdlan, xanthan gum, gellan gum, pullulan, polydextrose, slightly-digestible dextrin, guar gum degradation products, psyllium seed coat, low-molecular weight sodium alginate, inulin, or food starch modified by esterification, enzymatic denaturation, oxidation and acid treatment, gelatinization or other modification. As these water-soluble polysaccharides, those conventionally used for food thickeners, stabilizers or dietary fiber can be used, and these may be any of vegetable origin, animal origin, microorganism origin or chemically-modified.

The content of almost all of these water-soluble polysaccharides in the food or drink is 0.02% to 5% by weight, and preferably 0.05 to 3% by weight in view of the relief of astringency. When the water-soluble polysaccharide having a thickening effect is used in the beverage as an astringency relieving agent, it should be used in a such amount that the viscosity of the beverage is less than 10,000 cP (centipoise), preferably less than 1,000 cP, more preferably less than 100 cP because the viscosity is an important factor influencing the smoothness of swallowing. In this respect, starch materials forming the body of foods are not suitable for uses in beverages wherein smooth swallowing is of importance, but enzyme-treated maltodextrin having relatively low viscosity and no strange taste or strange smell can be used in the food or drink in an amount 1 to 20% by weight, preferably 2 to 15% by weight, and more preferably 3 to 10% by weight. However, the content of the water-soluble polysaccharides is not limited thereto, when it is used at higher concentrations in undrinkable food or drink such as high-viscosity food for patients with difficulty in swallowing.

Further, among these water-soluble polysaccharides, neutral water-soluble polysaccharides and specific acidic water-soluble polysaccharides having less reactivity with protein are preferable from the viewpoint of low influence on the transparency and stability of the food or drink. Examples of the neutral water-soluble polysaccharides include guar gum, locust bean gum, glucomannan, tamarind seed gum, pullulan, polydextrose, slightly-digestible dextrin, guar gum decomposition products, and the like. Among them, guar gum is especially effective to relieve the astringent taste because it well remains on the tongue and oral mucosa due to its thread-forming property.

Examples of the acidic water-soluble polysaccharides having low reactivity with protein include water-soluble soybean polysaccharides, psyllium seed gum, gum arabic, propylene glycol alginate, and the like. These polysaccharides having low reactivity with protein generally contain less acidic functional groups (e.g. carboxyl group, etc.), and among them, water-soluble soybean polysaccharides are specifically preferable to relieve astringency. Among water-soluble soybean polysaccharides, those having a low degree of esterification and high molecular weight are preferably used in conventional acidic protein food or drink such as sour milk and fermented milk. However, in the acidic food or drink containing dissolved protein of the present invention, the effect to relieve astringency does not change by the difference in the molecular weight and the degree of esterification. If anything, those with a high degree of esterification have good influence on the transparency and stability of the food or drink, and the degree of esterification is preferably 20% or higher, more preferably 40% or higher, and further preferably 60% or higher.

Further, while the acidic water-soluble polysaccharides such as pectin and water-soluble potato dietary fiber have some astringency relieving effect, they disadvantageously react with protein dissolved under acidic conditions, thereby decreasing the transparency of the resulting food or drink and forming precipitate of protein. However, when they are used in combination with the water-soluble polysaccharides having low reactivity with protein, astringency is synergistically relieved and the precipitation is prevented. In such cases, the acidic water-soluble polysaccharides used can be used in the same amount or less than that of the water-soluble polysaccharides having low reactivity with protein and, usually, about 0.1 to 0.5-fold amount is sufficient.

The upper limit of the content of the water-soluble soybean polysaccharides is not specifically limited, but the astringency relieving effect can be sufficiently achieved by using them in the food or drink in an amount of 0.05% to 3% by weight, and preferably 0.1% to 2% by weight.

The above water-soluble polysaccharides may be preparations containing them therein, which may be used in combination with each other, and may be used in combination with an astringency relieving agent other than the water-soluble polysaccharides. The water-soluble polysaccharides may be added not only for relieving astringency, but also for changing the form or texture of the food or drink, and for supplying fibers.

Other examples of the saccharides having an astringency relieving effect include basic monosaccharides and oligosaccharides such as glucosamine and chitosan oligosaccharides. Examples of the water-soluble basic metal salts or the alkaline metals of organic acids include potassium gluconate, sodium gluconate, calcium lactate, fermented calcium lactate, calcium gluconate, and the like. These can be added to the food or drink without specific limitation. While the amount to be added varies depending upon particular type of the salt, composition of the food or drink and content of the protein, an astringency relieving effect is achieved when they are present in the food or drink in an amount of 0.3% to 8% by weight, and preferably 0.5% to 6% by weight. However, these salts may be added in excess of this range when they are added not only for relieving astringency but also for other purposes such as nutritional enhancement.

Among them, calcium salts have a higher astringency relieving effect and, particularly, calcium gluconate is preferable due to its mild sour taste, though depending on the usage and content. The calcium salts achieve an astringency relieving effect, when they are contained in the food or drink as calcium ion in an amount of 0.03% to 0.8% by weight, preferably 0.05% to 0.6% by weight. The astringency relieving agents described above may be used alone, or in combination thereof.

The acidic protein food or drink of the present invention is in the form of, for example, an acidic beverage containing additives such as an acidulant, or fruit or vegetable juice, and the fruit or vegetable juice may be clear type or cloudy type. Conventionally, there has been such a demand that cloudy type fruit juice should not form dregs, while clear type ones should have transparency. According to the present invention, the problem of formation of dregs is solved and further a secondary effect that stability of the beverage is increased is also obtained. Examples of other forms include concentrated acidic liquid diets and acidic liquid nutrients containing protein as a nitrogen source, protein-containing acidic jelly beverages and gel foods, acidic semi-solid paste foods such as flour paste, and acidic emulsions such as whipped cream, frozen desserts containing aqueous and oil phases, and the like. As frozen desserts melt in the mouth, the astringency of the dissolved protein is remarkably relieved in the same manner as beverages. The above jelly beverages and gel foods are not limited to those gelatinized by a gelling agent, but include gelatinized protein itself, which may be an emulsified gel containing oil and fat.

The addition of the salts or saccharides, and the acidic-soluble protein to the acidic protein food or drink is not specifically limited, and they may be added during preparation of the powdery acidic-soluble protein, for example before spray-drying. Then, a powder material containing the acidic-soluble protein and one or more of salts or saccharides selected from the group consisting of water-soluble polysaccharides, water-soluble basic salts, alkali metal salts of organic acids, basic monosaccharides and basic oligosaccharides can be used as a raw material of beverages. The ratio of the salts or saccharides to the acidic-soluble protein in such a material may be freely selected according to the desired type of the food or drink to be produced, but normally in the range of from 0.01 to 1.

Hereinafter, the analysis methods used in the present invention will be illustrated.

Solubility: Solubility (%) is a scale of solubilization of protein in a solvent. Protein powder was dispersed in water so that the concentration of the constituent protein became 5.0% by weight, and thoroughly stirred. After adjusting the pH of the resulting solution if necessary, the solution was centrifuged at 10,000 G for 5 minutes, and the proportion of the supernatant protein to the total protein was determined by a protein determination method such as Kjeldahl method, Lowry method, etc.

Transmittance: Transmittance (% T) is a scale of the transparency of a solution containing protein. Protein powder was dispersed in water so that the concentration of the constituent protein became 5.0% by weight, and thoroughly stirred. After adjusting the pH of the resulting solution if necessary, the transmittance (% T) at 600 nm was measured using a 1 cm cell and a spectrophotometer (U-3210 automatic recording spectrophotometer manufactured by Hitachi, Ltd.).

Viscosity: Viscosity (cP) was measured for the solution at 25° C. using a B type viscometer (manufactured by TOKYO KEIKI Co., Ltd.).

Beverage stability: Stability was evaluated by the presence or absence of a precipitate after storing at 5° C. for 1 month.

EXAMPLES

Hereinafter, the present invention will be further illustrated, but the technical scope of the present invention is not limited by the following Examples. All the percents and parts are by weight unless otherwise stated.

Preparation Example 1

Soybeans were pressed, and oil was removed and separated by extraction with n-hexane as the extraction solvent. To 5 kg of the above-obtained low denatured defatted soybean (nitrogen soluble index, NSI: 91) was added 35 kg of water, and the mixture was adjusted to pH 7 with a dilute sodium hydroxide solution. After extracting with stirring at room temperature for 1 hour, the mixture was centrifuged at 4,000 G to remove "okara (soy pulp) and insolubles, thereby obtaining defatted soybean milk. The defatted soybean milk was adjusted to pH 4.5 with phosphoric acid, centrifuged at 2,000 G using a continuous centrifugal machine (decanter), and an insoluble fraction (acid precipitated curd) and a soluble fraction (whey) were obtained. Water was added to the acid precipitated curd so that the solid content became 10% by weight to obtain acid precipitated curd slurry. The slurry was adjusted to pH 3.5 with phosphoric acid, heated with a continuous direct heat sterilizer at 120° C. for 15 seconds, and spray-dried to obtain 1.5 kg of acidic-soluble soybean protein powder (hereinafter abbreviated as S). Solubility of this protein was 61% at pH 4.0.

Preparation Example 2

The acid precipitated curd slurry prepared in Preparation Example 1 was adjusted to pH 4.0 with phosphoric acid, and heated to 40° C. To the solution was added phytase (manufactured by Novo Nordisk A/S) in an amount corresponding to 8 units per solids, and the mixture was subjected to the enzymatic reaction for 30 minutes. After the reaction, the mixture was adjusted to pH 3.5, and heated with a continuous direct heat sterilizer at 120° C. for 15 seconds, and spray-dried to obtain 1.5 kg of acidic-soluble soybean protein powder (hereinafter abbreviated as T). Solubility of this protein was 95% at pH 4.5.

Preparation Example 3

According to the same manner as that in Preparation Example 2, the enzymatic reaction was carried out for 30 minutes with phytase (manufactured by Novo Nordisk A/S) to obtain a reaction mixture. To the reaction mixture was added a water-soluble soybean polysaccharide (SOYAFIVE, degree of esterification: 60% order, manufactured by Fuji Oil Company, Limited.) was added so that the concentration became 2% by weight, and the mixture was thoroughly dissolved. The mixture was adjusted to pH 3.5, heated with a continuous direct heat sterilizer at 120° C. for 15 seconds, and spray-dried to obtain 1.6 kg of acidic-soluble soybean protein powder (hereinafter abbreviated as U). Solubility of this protein was 91% at pH 4.0.

Test Examples

Aqueous solutions containing 3% of T prepared in Preparation Example 2, 13% of fructose-glucose syrup and given amounts of respective astringency relieving agents were heat-sterilized in boiling water for 10 minutes to prepare acidic protein beverages. Each beverage was pH 3.5 and solubility was 95%, and the major part of the protein was dissolved. The type and amounts of the astringency reducing agents added, and the evaluation of the beverages are shown in Table 1. Astringency was evaluated by 10 panelists using sensory evaluation. Astringency of the beverage containing no astringency reducing agent was evaluated as +++ (strong astringent) and used as the standard. On the basis of the degree of astringency relieving, the beverages were evaluated as ++ (astringency was slightly relieved), + (astringency was remarkably reduced), ± (astringency was little felt), and − (no astringency was felt). The trade names and manufacturers of the astringency reducing agents used in Test Example are as follows.

Water-soluble soybean polysaccharide: "Soyafive", degree of esterification: 60% order and 20% order (manufactured by Fuji Oil Company, Limited.)

Pectin: "YM-150-LJ" (manufactured by Sansho Co., Ltd.)

Psyllium seed gum (manufactured by Shikibo Ltd.)

Guar gum: "Bistop D-2029" (manufactured by San-Ei Gen F.F.I., Inc.)

Glucomannan: "Rheolex RS" (manufactured by Shimizu Chemical Corporation)

Tamarind gum: "Glyloid 2A" (manufactured by Dainippon Pharmaceutical Co., Ltd.)

Water-soluble dietary fiber: "Nisshoku Cell-Ace" (manufactured by Nihon Shokuhin Kako Co., Ltd.)

Maltodextrin: "Amicol No. 3-L" (manufactured by Nihon Shokuhin Kako Co., Ltd.)

Water-soluble potato dietary fiber; (manufactured by Fuji Oil Company, Limited.)

Sodium gluconate: "Helshas A" (manufactured by Fujisawa Pharmaceutical Co., Ltd.)

Calcium gluconate: (manufactured by Tomita Pharmaceutical Co., Ltd.)

Glucosamine: "Glucosour" (manufactured by Koyo Chemical Company Limited.)

TABLE 1

|  |  | Astringency-relieving agent | Amount (%) | Transmittance (% T) | Viscosity (cP) | Stability | Astringency |
|---|---|---|---|---|---|---|---|
| Test Example | 1 | Water-soluble soybean polysaccharide (degree of esterification: 60% order) | 0.5 | 70 | 6 | — | ± |
|  | 2 | Water-soluble soybean polysaccharide (degree of esterification: 20% order) | 0.5 | 40 | 6 | — | ± |
|  | 3 | Pectin | 0.5 | 5 | 25 | Slightly precipitated | + |
|  | 4 | Psyllium seed gum | 0.5 | 65 | 30 | — | + |
|  | 5 | Guar gum | 0.1 | 80 | 15 | — | ± |
|  | 6 | Glucomannan | 0.1 | 80 | 12 | — | + |

TABLE 1-continued

| | Astringency-relieving agent | Amount (%) | Transmittance (% T) | Viscosity (cP) | Stability | Astringency |
|---|---|---|---|---|---|---|
| 7 | Tamarind gum | 0.5 | 75 | 25 | — | + |
| 8 | Water-soluble dietary fiber | 2 | 65 | 15 | — | + |
| 9 | Maltodextrin | 5 | 80 | 4 | — | ± |
| 10 | Water-soluble soybean polysaccharide (degree of esterification: 60% order) + pectin | 0.4 + 0.1 | 20 | 8 | — | − |
| 11 | Water-soluble soybean polysaccharide (degree of esterification: 60% order) + potato dietary fiber | 0.4 + 0.1 | 40 | 7 | — | − |
| 12 | Sodium gluconate | 1 | 80 | 4 | — | + |
| 13 | Calcium gluconate | 1 | 80 | 4 | — | ± |
| 14 | Glucosamine | 1 | 80 | 4 | — | + |
| Comparative Example 1 | None | | 80 | 4 | — | +++ |

Example 1

Beverage

Guar Gum

An aqueous solution containing 3% of S prepared in Preparation Example 1, 0.1% of Bistop D-2029" (manufactured by San-Ei Gen F.F.I., Inc.), 12.8% of fructose-glucose liquid sugar, 2% of a concentrated passion fruit juice (cloudy type) and 2% of a concentrated orange juice was heat-sterilized in boiling water for 10 minutes to prepare an acidic protein beverage. The beverage was pH 3.7. Film formation feeling was little felt, and astringency was remarkably relieved.

Comparative Example 2

An aqueous solution containing 3% of T prepared in Preparation Example 2, 12.8% of fructose-glucose liquid sugar, 2% of a concentrated passion fruit juice (cloudy type) and 2% of a concentrated orange juice was heat-sterilized in boiling water for 10 minutes to prepare an acidic protein beverage. The beverage was pH 3.7. Film formation feeling was felt in the mouth, and astringency was strongly felt. The stability of the food or drink prepared in Comparative Example 2 was inferior to that of Example 1.

Example 2

Beverage

Water-Soluble Soybean Polysaccharide

An aqueous solution containing 3% of S prepared in Preparation Example 1, 1.8% of water-soluble soybean polysaccharide (Soyafive, manufactured by Fuji Oil Company, Limited., degree of esterification: 20% order), 15% of fructose-glucose liquid sugar and 5% of a concentrated grapefruit fruit juice (clear type) was heat-sterilized in boiling water for 10 minutes to prepare an acidic protein beverage. The beverage was pH 3.6. Film formation feeling was little felt, and astringency was remarkably relieved.

Example 3

Beverage

Calcium Gluconate

An aqueous solution containing 3% of T prepared in Preparation Example 2, 1.0% of a calcium gluconate preparation (Gluconal CAL, manufactured by Meiji Sika Kaisha, Ltd.), 15% of fructose-glucose liquid sugar and 5% of a concentrated muscat fruit juice (clear type) was heat-sterilized in boiling water for 10 minutes to prepare an acidic protein beverage. The beverage was pH 3.8. Film formation feeling was little felt, and astringency was remarkably relieved.

Example 4

Beverage

Maltodextrin

An aqueous solution containing 3% of T prepared in Preparation Example 2, 5.0% of maltodextrin (Amicol No. 3-L, manufactured by Nihon Shokuhin Kako Co., Ltd.), 15% of fructose-glucose liquid sugar and 5% of a concentrated muscat fruit juice (clear type) was heat-sterilized in boiling water for 10 minutes to prepare an acidic protein beverage. The beverage was pH 3.8. Film formation feeling was little felt, and astringency was remarkably relieved.

Example 5

Beverage

Water-Soluble Soybean Polysaccharide

An aqueous solution containing 3% of a commercially available milk whey protein isolate (Provon 190, manufactured by Glanbia Nutritionals), 13% of fructose-glucose liquid sugar and 1.5% of water-soluble soybean polysaccharide (Soyafive, degree of esterification: 60% order, manufactured by Fuji Oil Company, Limited.) was adjusted to pH 3.5 with citric acid, and heat-sterilized in boiling water for 10 minutes to prepare an acidic protein beverage. Film formation feeling was little felt, and astringency was remarkably relieved.

Example 6

Beverage

Water-Soluble Soybean Polysaccharide and Pectin

An aqueous solution containing 3% of T prepared in Preparation Example 2, 0.4% of water-soluble soybean polysaccharide (Soyafive, degree of esterification: 60% order, manufactured by Fuji Oil Company, Limited.) 0.1% of pectin (YM-150-LJ, manufactured by Sansho Co., Ltd.), 15% of fructose-glucose liquid sugar and 5% of a concentrated pineapple juice (cloudy type) was heat-sterilized in boiling water for 10 minutes to prepare an acidic protein beverage. The beverage was pH 3.7. Film formation feeling was not felt, and astringency was further relieved.

Example 7

Beverage

Water-Soluble Soybean Polysaccharide and Water-Soluble Potato Dietary Fiber An aqueous solution containing 3.0% of T prepared in Preparation Example 2, 0.4% of water-soluble soybean polysaccharide (Soyafive, degree of esterification: 60% order, manufactured by Fuji Oil Company, Limited.), 0.1% of water-soluble potato dietary fiber (manufactured by Fuji Oil Company, Limited.), 15% of fructose-glucose liquid sugar and 5% of a concentrated passion fruit juice (cloudy type) was heat-sterilized in boiling water for 10 minutes to prepare an acidic protein beverage. The beverage was pH 3.8. Film formation feeling was not felt, and astringency was further relieved.

Example 8

Jelly Beverage

Water-Soluble Soybean Polysaccharide

A mixture of 85 parts of an aqueous solution containing 3 parts of T prepared in Preparation Example 2, 3 parts of a concentrated pineapple juice (cloudy type), 0.1% of a pineapple flavor, 0.01 part of a highly-sensitive sweetener (Sucralose, manufactured by San-Ei Gen F.F.I., Inc.) and 0.5% of water-soluble soybean polysaccharide (Soyafive, degree of esterification: 20% order, manufactured by Fuji Oil Company, Limited.) was warmed to 80° C., mixed with 15 parts of a 3% agar solution (UP-37K, manufactured by Ina Food Industry Co., Ltd.) at 85° C., and packed in a Cheer Pack, a flexible container with a cap having a straw-like spout, to prepare a jelly beverage containing acidic protein. The beverage was pH 3.5. Astringency was reduced, and swallowing was favorable.

Example 9

Ice Cream

Water-Soluble Soybean Polysaccharide

Ten parts of T prepared in Preparation Example 2, 0.2 parts of water-soluble soybean polysaccharide (Soyafive, degree of esterification: 20% order, manufactured by Fuji Oil Company, Limited), 120 parts of a concentrated orange juice (cloudy type), 180 parts of granulated sugar and 50 parts of glucose were mixed, and added to the mixture of 100 parts of cocoanut oil and 540 parts of water which had been melted by warming to 60° C. The mixture was heated to 70° C., and dissolved with stirring for 15 minutes. Then, the solution was homogenized with a homogenizer at pressure of 100 kg/cm$^2$, and heated with a UHT plate sterilizer at 120° C. for 15 seconds. The sterilized mixture was cooled to 5° C., and aged for 20 hours in a refrigerator to obtain an ice cream mix. The resulting mix was charged in a soft cream freezer, and a soft cream-like frozen dessert was prepared. Astringency was reduced and the flavor was favorable.

Example 10

3 parts of powdery U prepared in Preparation Example 3 were dissolved in 100 parts of a commercially available concentrate-reconstituted 100% orange juice. The beverage was pH of 3.7. The beverage had little film formation feeling derived from the acidic-soluble soybean protein, and astringency was remarkably reduced. The similar effect was observed when the water-soluble soybean polysaccharide was added during the production process of the acidic-soluble soybean protein.

The invention claimed is:

1. A method for producing a powdered acidic-soluble soybean protein material, which comprises:
    preparing a powder comprising an acidic-soluble soybean protein and a water-soluble soybean polysaccharide,
    wherein the acidic-soluble soybean protein has a solubility of 55% or higher at pH of 2.0 to 4.5, and
    wherein the value of the solubility is determined by a method which comprises, in order, the steps of:
    dispersing the acidic-soluble soybean protein powder in water so that a concentration of the acidic-soluble soybean protein is 5.0% by weight,
    adjusting the pH of the resulting solution to pH 2.0 to 4.5,
    subjecting the resulting solution to centrifugation at 10,000 G for 5 minutes, and
    determining a proportion of the resulting supernatant protein to total protein of the acidic-soluble soybean protein by a protein determination method.

* * * * *